United States Patent [19]

Berecz

[11] 4,367,060

[45] Jan. 4, 1983

[54] METHOD OF MAKING A SEAL NUT

[75] Inventor: Imre Berecz, Dana Point, Calif.

[73] Assignee: Microdot Inc., Darien, Conn.

[21] Appl. No.: 155,846

[22] Filed: Jun. 2, 1980

Related U.S. Application Data

[63] Continuation of Ser. No. 947,821, Oct. 2, 1978.

[51] Int. Cl.³ .............................................. F16B 39/34
[52] U.S. Cl. ..................................... 411/303; 10/86 A
[58] Field of Search ...................... 411/303, 302, 301;
10/86 A, 86 F

[56] References Cited

U.S. PATENT DOCUMENTS

| | | | |
|---|---|---|---|
| 3,004,776 | 10/1961 | Sebardt | 411/303 X |
| 3,040,796 | 6/1962 | Grouverneur | 411/303 |
| 3,220,453 | 11/1965 | Greeno | 411/301 |
| 3,221,790 | 12/1965 | Poupitch | 411/301 |
| 3,289,724 | 12/1966 | Ernest | 411/303 |
| 3,399,589 | 9/1968 | Breed | 411/428 |
| 3,437,118 | 4/1969 | Coyle | 411/302 |
| 3,520,342 | 7/1970 | Scheffer | 411/303 |
| 3,522,830 | 8/1970 | Blizard | 411/303 |
| 3,572,414 | 3/1971 | Onufer | 411/270 |
| 3,635,272 | 1/1972 | Scheffer et al. | 411/303 |
| 3,742,808 | 7/1973 | Trembley | 411/432 |
| 3,797,547 | 3/1974 | Shinjo | 411/303 |
| 3,938,571 | 2/1976 | Hechberger | 411/303 |
| 4,004,626 | 11/1977 | Biblin et al. | 411/277 |
| 4,019,550 | 4/1977 | DeHaitre | 411/303 |

FOREIGN PATENT DOCUMENTS 1384600  2/1975  United Kingdom .

Primary Examiner—Ramon S. Britts
Attorney, Agent, or Firm—Lyman R. Lyon

[57] ABSTRACT

An improved method of manufacturing a sealing nut having a sealing ring insert is disclosed. The process eliminates the costly step of machining an undercut into the counterbore of the nut blank to provide a means for retaining the sealing ring in place. This is accomplished by leaving a predetermined amount of excess material protruding around the periphery of the counterbore when the counterbore is initially cold formed. When the bearing surface is subsequently flattened by an additional cold forming step, the excess material is forced radially inwardly thereby reducing slightly the diameter of the counterbore at the bearing surface of the nut. The elimination of the undercutting operation also results in a nut having improved torque and load bearing characteristics.

1 Claim, 7 Drawing Figures

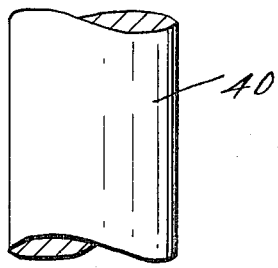
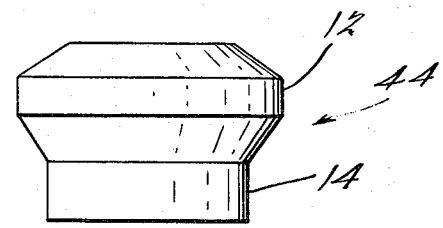
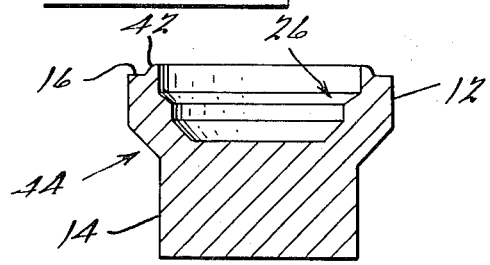
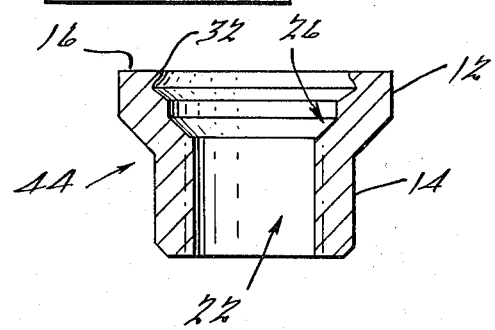

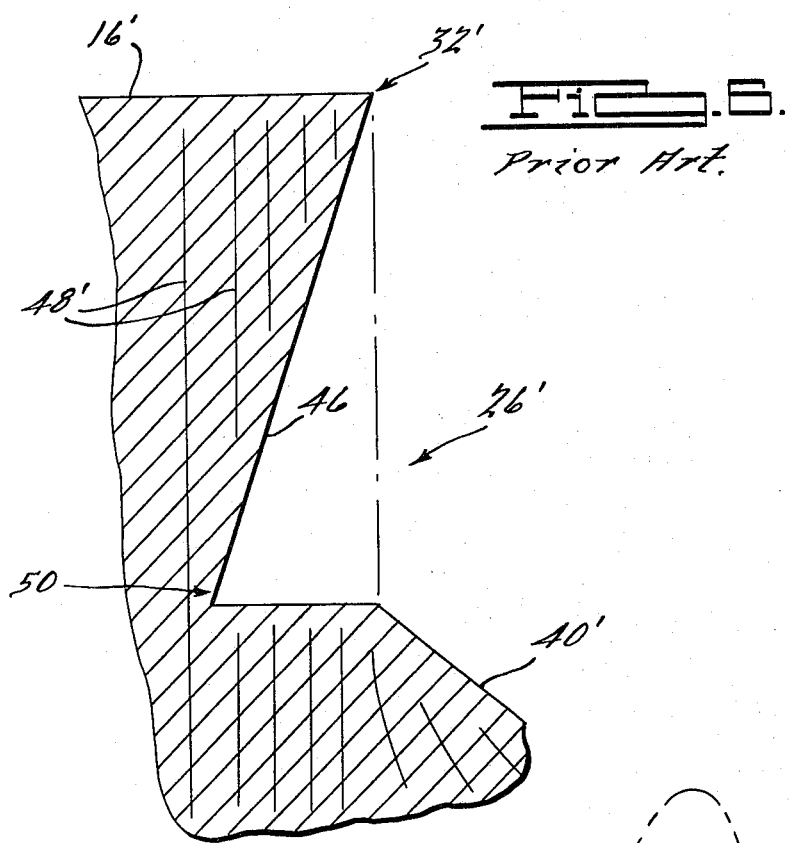
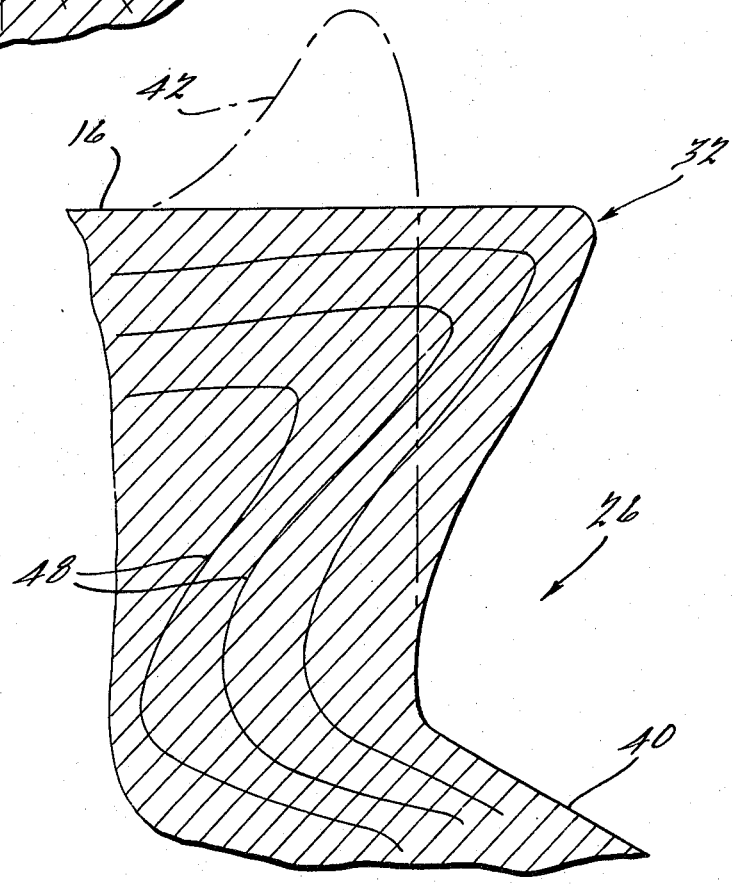

METHOD OF MAKING A SEAL NUT

This is a continuation of application Ser. No. 947,821, filed Oct. 2, 1978.

BACKGROUND AND SUMMARY OF THE INVENTION

The present invention relates to a fluid-sealing nut and in particular to an improved method of making the same.

Sealing nuts of the present type are commonly used in the aircraft industry wherein many aircraft are designed with "wet" wings which require that the fasteners utilized in the wings form a fluid-tight seal. Currently, the most widely used type of sealing nut in the aircraft industry comprises a nut having an annular deformable sealing ring inserted into a counterbore cut into the bearing surface of the nut. Typically, the sealing ring is designed to protrude above the bearing surface of the nut so that when the nut is torqued down against the workpiece, the sealing ring is deformed inwardly into the threads on the shank of the bolt thereby forming a fluid-tight seal.

Sealing nuts of this type are generally made by a process whereby a counterbore is cold formed into the bearing surface of the nut and then an undercut is machined into the side walls of the counterbore to provide a means for retaining the sealing ring in place. The disadvantage of this process is that the undercut requires a separate machining operation which slows the production rate of the sealing nuts and hence significantly increases cost. Moreover, as with all cutting operations, the undercut surface creates a weakened stress point in the nut which restricts the torque and load limits of the nut.

The present invention seeks to eliminate these disadvantages by providing a new and improved method of making the above-described sealing nut. In particular, utilizing the method of the present invention, when the nut is initially cold formed according to conventional practice, a protruding ridge of excess material is purposefully retained around the periphery of the counterbore. When the nut is then cold formed a second time to smooth the bearing surface of the nut, the excess material is forced inwardly, thereby reducing slightly the surface diameter of the counterbore. In this manner, a means for retaining the sealing ring is created without requiring a separate machining operation and without weakening the structure of the nut. In fact, as will subsequently be explained in greater detail, the cold forming process of the present invention actually strengthens the load bearing surface of the nut. Thus, the resulting sealing nut produced is not only less costly to manufacture but is also a better quality nut.

Additional objects and advantages of the present invention will become apparent from a reading of the detailed description of the preferred embodiment which make reference to the following set of drawings in which:

BRIEF DESCRIPTION OF THE DRAWINGS

FIGS. 1-4 illustrate the various stages in the manufacture of a sealing nut according to the teachings of the present invention;

FIG. 5 is a partial cutaway of a complete sealing nut manufactured according to the present invention;

FIG. 6 is an enlarged view of the counterbore of a nut blank made according to conventional practice; and FIG. 7 is an enlarged view of the counterbore of a nut blank made according to the teachings of the present invention.

DETAILED DESCRIPTION OF THE PREFERRED EMBODIMENT

A complete sealing nut 10 made according to the present invention is illustrated in FIG. 5. The sealing nut 10 includes a body comprising a base section 12 and a torque receiving section or "wrench pad" 14. The torque-receiving section 14 typically bears a plurality of driving surfaces 20 which are adapted to be engaged by a conventional wrench. The base section 12 of the nut 10 includes a flat annular bearing surface 16 of expanded diameter relative to the torque-receiving section 14, and a tapered portion 18 which joins the base section 12 to the torque-receiving section 14.

The sealing nut 10 has formed therein a central bore 22 having an internal thread 24. The threaded portion 24 of the central bore 22 is substantially limited to the torque-receiving section 14 of the sealing nut 10, with the central bore 22 being enlarged by a counterbore 26 at the base end 12 of the nut 10. The counterbore 26 is actually a two-step counterbore with the diameter of the central bore 22 being increased initially from the threaded diameter 24 to a first enlarged diameter 28 and then further increased to a second enlarged diameter 30 at the base end 12 of the nut 10. Importantly, it will be noted that the final enlarged counterbore diameter 30 is reduced slightly at the bearing surface 16 of the nut 10 as indicated at 32. The purpose of the "lip" 32, as noted previously, is to provide a means for retaining the sealing ring 34 in place.

In particular, sealing ring 34 comprises an annular-shaped deformable plastic material, such as teflon, that has an inner diameter 34 slightly larger than the threaded diameter 24 of the central bore 22 and an outer diameter 38 substantially equivalent to the second enlarged counterbore diameter 30. In this manner, the sealing ring 34 is adapted to be press-fitted into the second enlarged counterbore 30 so that it seats against the ledge 40 and is frictionally secured in place by the reduced diameter of the lip 32.

In addition, it will be noted that the thickness of the sealing ring 34 is substantially greater than the depth of the second enlarged counterbore 30 so that the sealing ring 34 protrudes above the bearing surface 16 of the nut 10 when properly secured within the counterbore 30. In this manner, when the nut 10 is torqued down to the point where the bearing surface 16 contacts the workpiece, the protruding portion of the sealing ring 34 is deformed inwardly into the threads of the bolt on which the nut 10 is fastened, thereby forming a fluid-tight seal along the shank of the bolt. The deformation of the sealing ring 34 also serves the added purpose of locking the nut 10 to the bolt to resist loosening due to vibration, etc.

Referring now to FIGS. 1-4, the preferred method of making the above described sealing nut 10 according to the present invention will now be explained. The nut blanks 44 used to make the sealing nuts 10 described herein are made from a metal slug 40, herein comprised of aluminum. The slug 40 is initially cold formed into the basic configuration of the nut blank 44 illustrated in FIG. 2 with a torque-receiving end 14 and a flanged base section 12. The nut blank 44 is then cold formed a second time to form the counterbore 26 in the base end 12 of the nut. The bearing surface 16 of the nut is also formed during the step so as to leave an annular ring or "lip" 42 of excess material protruding above the bearing surface 16 around the periphery of the counterbore 26. Typically, the driving surfaces 20 on the torque-receiving end 14 (FIG. 5) are formed during this step as well. The nut blank 44 is then cold formed a third time to flatten the bearing surface 16 of the nut, thereby causing the excess material in the "lip" 42 to flow radially inwardly as indicated at 32, thereby reducing slightly the diameter of the counterbore 26 at the bearing surface 16 of the nut. The central bore 22 is then machined through the torque-receiving end 14 of the nut and an appropriate internal thread formed therein. The annular sealing ring 36 is subsequently snap-fitted into the counterbore 26 to complete the sealing nut 10 illustrated in FIG. 5.

Referring to FIGS. 6 and 7, the advantages of producing the sealing nut 10 according to the present invention will now be explained. In FIG. 6, an enlarged view of a section of the counterbore 26 of a nut blank 44 formed according to conventional practice is shown. As is well known to those skilled in the art, the cold forming process creates metal flow lines 48' in the nut blank 44' which substantially follow the contour of the cold formed counterbore 26'. However, when the undercut 46 is machined into the counterbore 26' according to prior art practice, flow lines 48' are broken by the machining operation, thus creating a stress point or stress "riser" 50 in the vicinity of the bend at the base of the undercut 46. The effect of the stress riser 50 is to concentrate stress forces at this point, thereby reducing the integrity of the nut and restricting the torque and load limits of the nut.

In FIG. 7, however it can be seen that a nut blank 44 made pursuant to the teachings of the present invention results in metal flow lines which substantially follow the contour of the "lip" 32. Specifically, when the lip 32 is bent over from the position indicated by the dotted line 42, the cold forming process causes the flow lines 48 to follow the movement of metal radially inwardly creating the slightly reduced diameter in the counterbore 26 at the bearing surface 16. Thus, the disadvantage of breaking flow lines caused by the undercutting operation is eliminated.

Accordingly, as will be appreciated by those skilled in the art, the nut blank 44 made according to the process of the present invention possesses superior load bearing characteristics than a nut manufactured pursuant to prior known methods. Moreover, as noted in the background and summary, because the lip 32 is cold formed rather than undercut by a separate machining operation, the cost of manufacturing the nut according to the process of the present invention is significantly reduced.

While the above description constitutes the preferred embodiment of the invention, it will be appreciated that the invention is susceptible to modification, variation and change without departing from the proper scope or fair meaning of the accompanying claims.

What is claimed is:

1. In a metal seal nut comprising a body having an internally threaded bore and an external wrenching surface, the improvement comprising a truncated conical annulus at one end of said bore, a relatively wide flat bearing surface on said nut body extending radially outwardly directly from the minor diameter of said annulus for the acceptance of axial loads on said nut, the grain structure of the metal of said nut subject to axial loads being uninterrupted and extending radially generally parallel to said axial load bearing surface, thence axially inwardly and radially outwardly generally parallel to the conical outer wall of said annulus, thence radially inwardly from the major diameter of said annulus to said thread bore so as to maximize the load carrying capability of said nut, and a sealing ring in said annulus.

* * * * *

UNITED STATES PATENT OFFICE
CERTIFICATE OF CORRECTION

Reexamination Certificate
~~PATENT~~ NO. :     B1 4,367,060
DATED       :     June 21, 1988
INVENTOR(S) :     Imre Berecz It is certified that error appears in the above-identified patent and that said Letters Patent are hereby corrected as shown below:

Delete "METHOD FOR MAKING A" from the title.

Signed and Sealed this

Third Day of January, 1989

Attest:

DONALD J. QUIGG

*Attesting Officer*         *Commissioner of Patents and Trademarks*

REEXAMINATION CERTIFICATE (871st)
United States Patent
Berecz

[11] B1 4,367,060
[45] Certificate Issued Jun. 21, 1988

[54] METHOD FOR MAKING A SEAL NUT

[75] Inventor: Imre Berecz, Dana Point, Calif.

[73] Assignee: Microdot Inc., Darien, Conn.

Reexamination Request:
No. 90/001,335, Sep. 25, 1987

Reexamination Certificate for:
Patent No.: 4,367,060
Issued: Jan. 4, 1983
Appl. No.: 155,846
Filed: Jun. 2, 1980

Related U.S. Application Data

[63] Continuation of Ser. No. 947,821, Oct. 2, 1978, abandoned.

[51] Int. Cl.<sup>4</sup> ............................................. F16B 39/34
[52] U.S. Cl. .................................... 411/303; 10/86 A

[56] References Cited

U.S. PATENT DOCUMENTS

| | | | |
|---|---|---|---|
| 2,054,393 | 9/1936 | Sharp | 10/86 A |
| 2,116,036 | 5/1938 | Money | 411/309 |
| 2,266,961 | 12/1941 | Desbrueres | 10/86 A |
| 3,004,574 | 10/1961 | Flick et al. | 411/301 |
| 3,004,776 | 10/1961 | Sebardt . | |
| 3,040,796 | 6/1962 | Gouverneur, II . | |
| 3,203,459 | 8/1965 | Goldren | 411/303 X |
| 3,220,453 | 11/1965 | Greeno . | |
| 3,221,790 | 12/1965 | Poupitch . | |
| 3,289,724 | 12/1966 | Ernest . | |
| 3,354,481 | 11/1967 | Bergere . | |
| 3,399,589 | 9/1968 | Breed . | |
| 3,437,118 | 4/1969 | Coyle . | |
| 3,520,342 | 7/1970 | Scheffer . | |
| 3,522,830 | 8/1970 | Blizard . | |
| 3,572,414 | 3/1971 | Onufer . | |
| 3,635,272 | 1/1972 | Scheffer et al. . | |
| 3,742,808 | 7/1973 | Trembley . | |
| 3,797,547 | 3/1974 | Shinjo | 411/303 |
| 3,938,571 | 2/1976 | Heighberger . | |
| 3,971,085 | 7/1976 | Mount | 10/86 A |
| 4,004,626 | 1/1977 | Biblin et al. . | |
| 4,019,550 | 4/1977 | De Haitee . | |

FOREIGN PATENT DOCUMENTS

| | | |
|---|---|---|
| 511662 | 8/1939 | United Kingdom . |
| 1184269 | 3/1970 | United Kingdom . |
| 1384600 | 2/1975 | United Kingdom . |

OTHER PUBLICATIONS

Handbook of Fastening and Joining of Metal Parts, Vallory H. Laughner, Editor, McGraw-Hill Pub., 1956, p. 219.

Primary Examiner—Gary L. Smith

[57] ABSTRACT

An improved method of manufacturing a sealing nut having a sealing ring insert is disclosed. The process eliminates the costly step of machining an undercut into the counterbore of the nut blank to provide a means for retaining the sealing ring in place. This is accomplished by leaving a predetermined amount of excess material protruding around the periphery of the counterbore when the counterbore is initially cold formed. When the bearing surface is subsequently flattened by an additional cold forming step, the excess material is forced radially inwardly thereby reducing slightly the diameter of the counterbore at the bearing surface of the nut. The elimination of the undercutting operation also results in a nut having improved torque and load bearing characteristics.

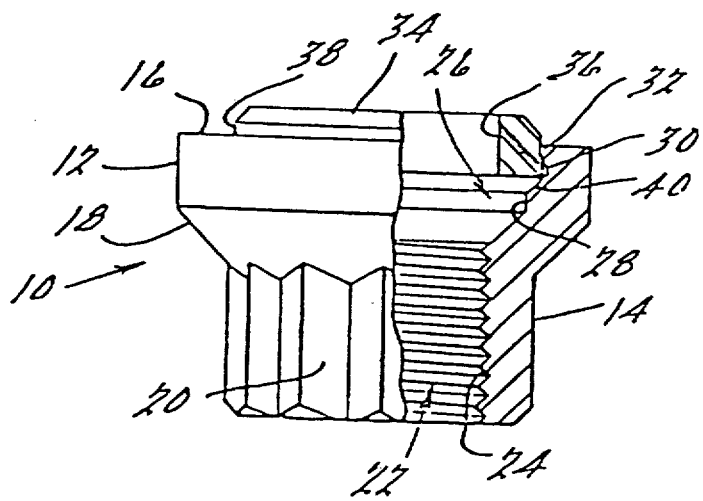

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claim 1 is confirmed.

* * * * *